J. C. Crismar,
Sugar Press,

Nº 46,781.        Patented Mar. 14, 1865.

Witnesses:
Wm F. McNamara
J. P. Hall

Inventor:
J. C. Crismar

UNITED STATES PATENT OFFICE.

J. C. CRISMAR, OF OMAHA CITY, NEBRASKA TERRITORY.

IMPROVED SUGAR-CANE PRESS.

Specification forming part of Letters Patent No. 46,781, dated March 14, 1865.

*To all whom it may concern:*

Be it known that I, J. C. CRISMAR, of Omaha City, in the county of Douglas and Territory of Nebraska, have invented a new and Improved Press, designed more especially for expressing juice from sugar-cane; and I do hereby declare that the following is a full, clear, and exact description thereof, which will enable others skilled in the art to make and use the same, reference being had to the accompanying drawings, making a part of this specification, in which—

Figure 1:
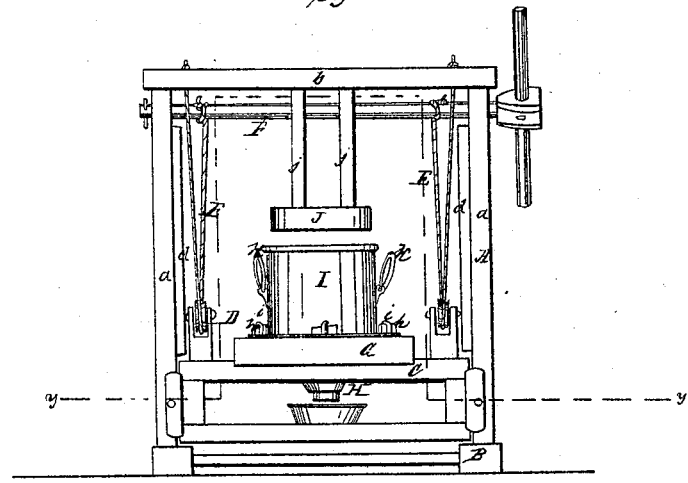
Figure 4:
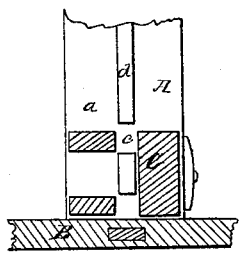
Figures 2, 5, 6, 7:
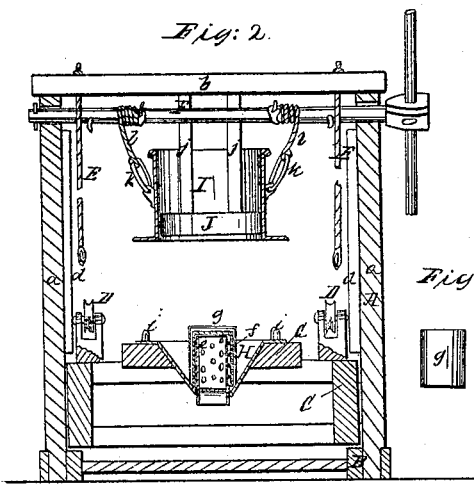
Figure 3:
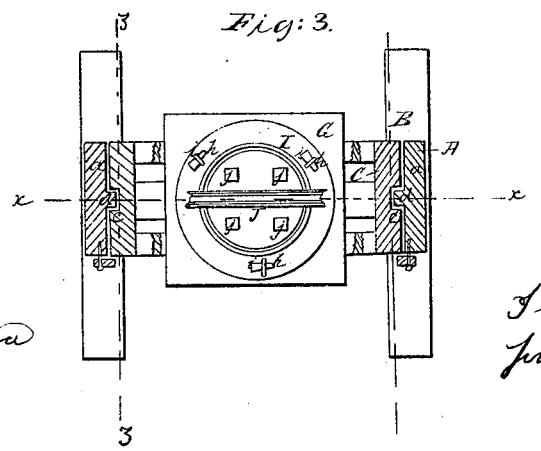

Figure 1 is a side elevation of my invention; Fig. 2, a vertical section of the same, taken in the line $x\,x$, Fig. 3; Fig. 3, a horizontal section of the same, taken in line $y\,y$, Fig. 1; Fig. 4, a vertical section of a portion of the same, taken in the line $z\,z$, Fig. 3; Figs. 5, 6, and 7, views of the perforated tubes and cloth through which the juice escapes from the press-box.

Similar letters of reference indicate like parts.

This invention relates to a new and improved arrangement of the press-box and plunger, as hereinafter fully shown and described, whereby the contents of the press-box, after being subjected to the requisite pressure, may be emptied of the cheese or refuse with the greatest facility.

A represents a framing, composed of two upright posts, $a\,a$, attached to a suitable base, B, and connected at their upper ends by a cross-bar, $b$. C represents a frame, which is fitted between the two posts $a\,a$ of the framing A, and has vertical grooves $c$ made in its sides to receive guides $d$ at the inner sides of the posts $a\,a$, as shown in Fig. 3. This frame C is allowed to slide freely up and down in the framing A, and it has a pulley, D, at each side of it, around which ropes E E pass, one end of the latter being attached to the cross-bar $b$ and the opposite end attached to a shaft, F, which passes horizontally through the upper parts of the posts $a\,a$ of the framing A, as shown clearly in Fig. 1.

On the frame C there is secured a bed-piece, G, in which the lower part, H, of the press-box is fitted. This part H of the press-box is of inverted conical form, and it projects a short distance down below G, and has perforated tubes $e\,f$ fitted in its bottom, said tubes being covered $b$ in Fig. 2.

The upper part, I, of the press-box is placed on the bed-piece G and directly over the lower part, H, and is connected to the bed-piece by keys or wedges $h$, which pass through staples $i$, as shown in Fig. 1, and to the cross-bar $b$ there are secured four pendants, $j\,j$, which have a circular plunger, J, secured to their lower end, said plunger just fitting the interior of the press-box. The upper part, I, of the press-box has a ring, $k$, secured to each side of it, to which ropes $l\,l$ are attached, said ropes, when in use, being connected to the shaft F.

The sugar-cane or other substance to be operated upon is placed in the press-box, the upper part, I, being secured to the bed-piece G directly over the lower part, H. The ropes E E are then attached to the shaft F and the latter turned, which causes the frame C to rise, and the substance within the press box is compressed in consequence of being drawn upward against the plunger J, the juice passing through the cloth $g$ and perforated tubes $e\,f$ and down into any receptacle prepared to receive it. After the juice is fully expressed from the substance within the press-box the ropes $l\,l$, which are attached to the press-box, are connected to the shaft F, and the upper part, I, of the press-box detached from the lower part. The shaft F is then turned in a reverse direction, and the upper part, I, is raised alone and the contents of the press-box forced out from it.

Thus by this simple arrangement the substance in the press-box may be compressed with the greatest facility, and the refuse, after the pressing operation, readily discharged from the press-box.

Having thus described my invention, I claim as new and desire to secure by Letters Patent—

The rising and falling frame C, in connection with the press-box, composed of two parts, I H, in combination with the fixed or stationary plunger J and shaft or windlass F, all arranged to operate substantially as and for the purpose herein set forth.

J. C. CRISMAR.

Witnesses:
BYRON REED,
H. M. DICKINSON.